Feb. 26, 1935.  M. J. ANDERSON  1,992,686
SELECTIVE DISPATCH AND AUTOMATIC DEFLECTOR CONTROL MECHANISM
Filed March 7, 1930   7 Sheets-Sheet 1
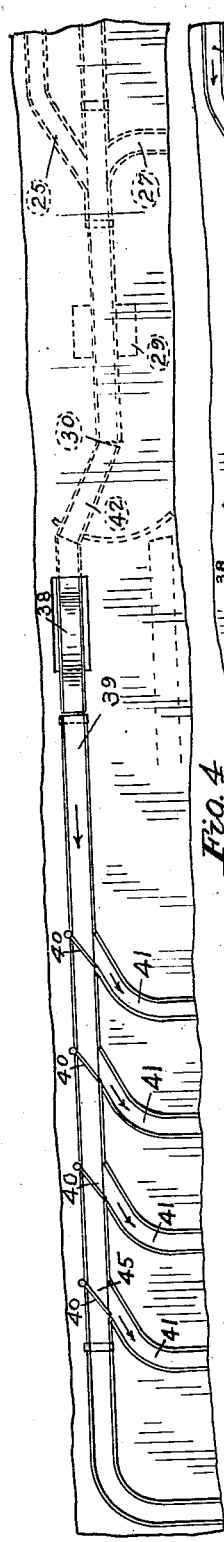
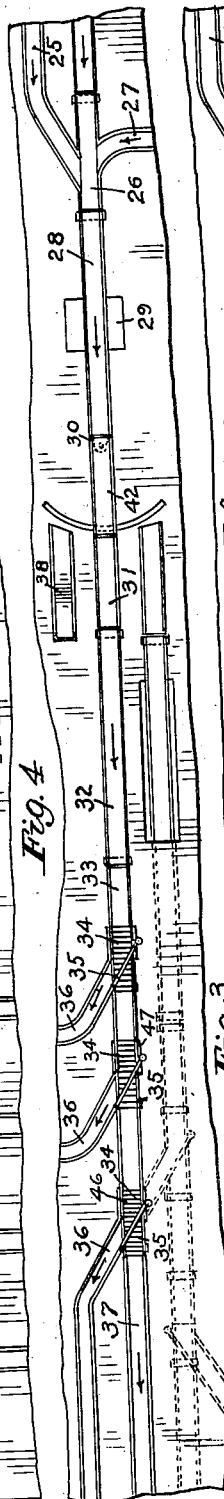
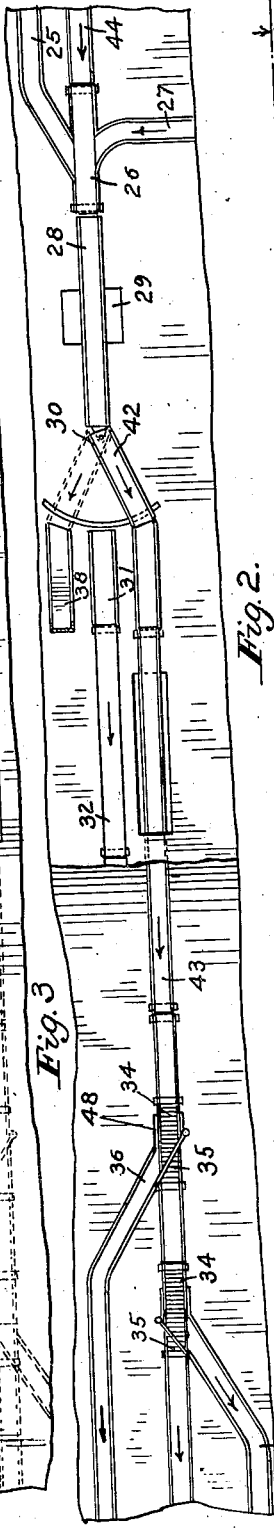
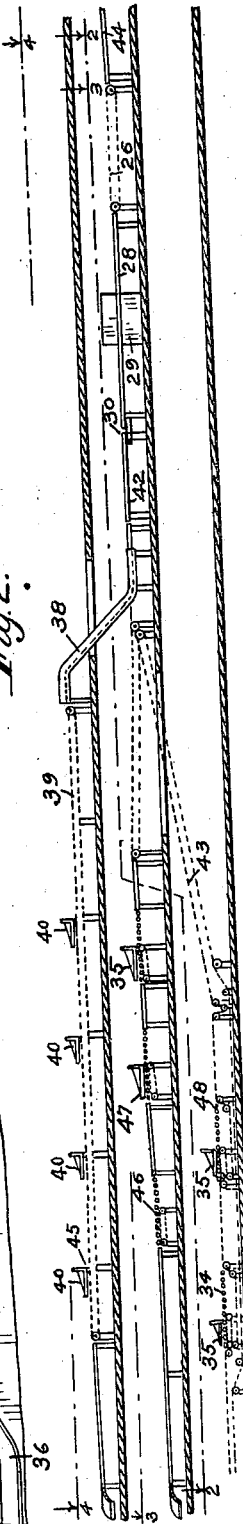
Inventor
MARTIN J. ANDERSON
By
Attorneys

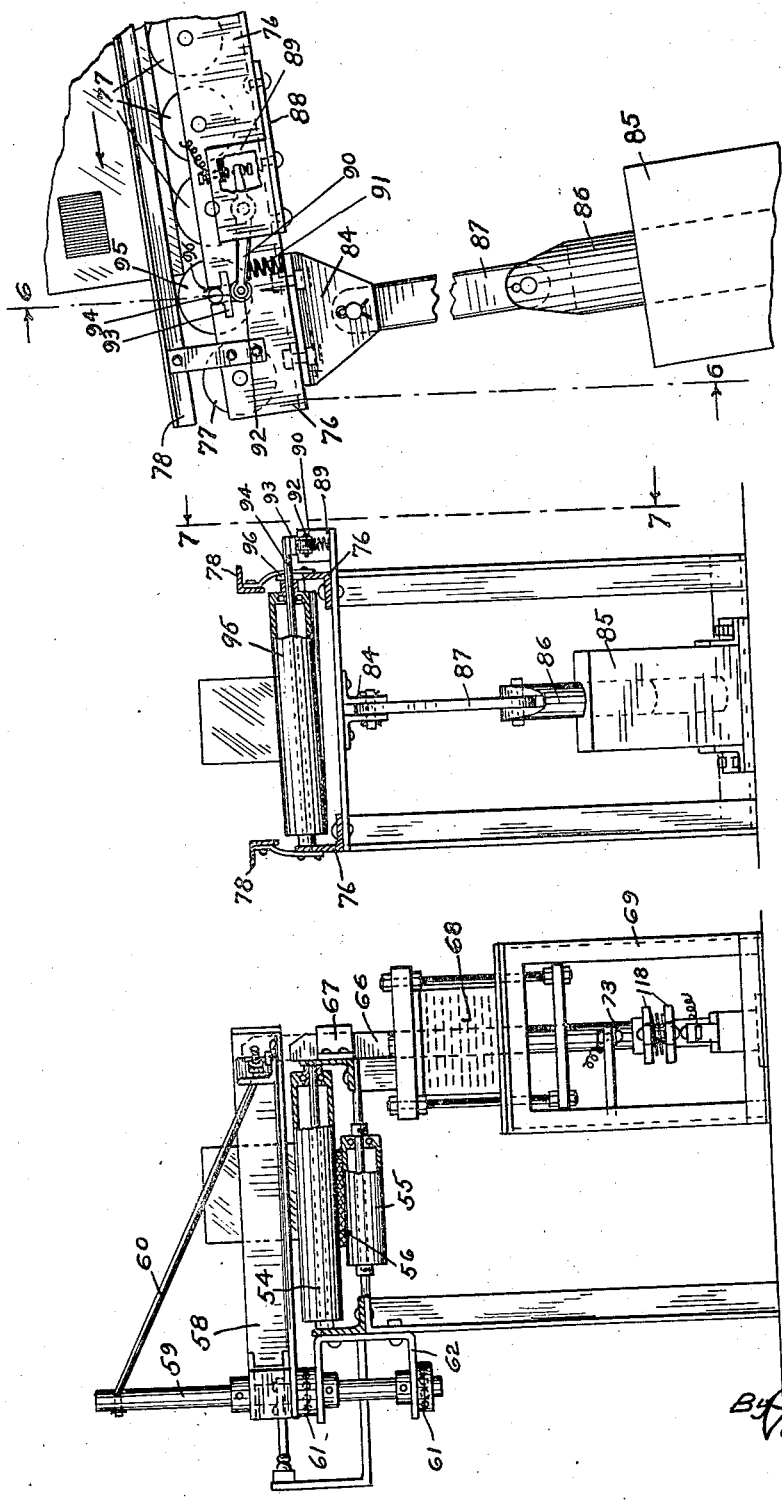

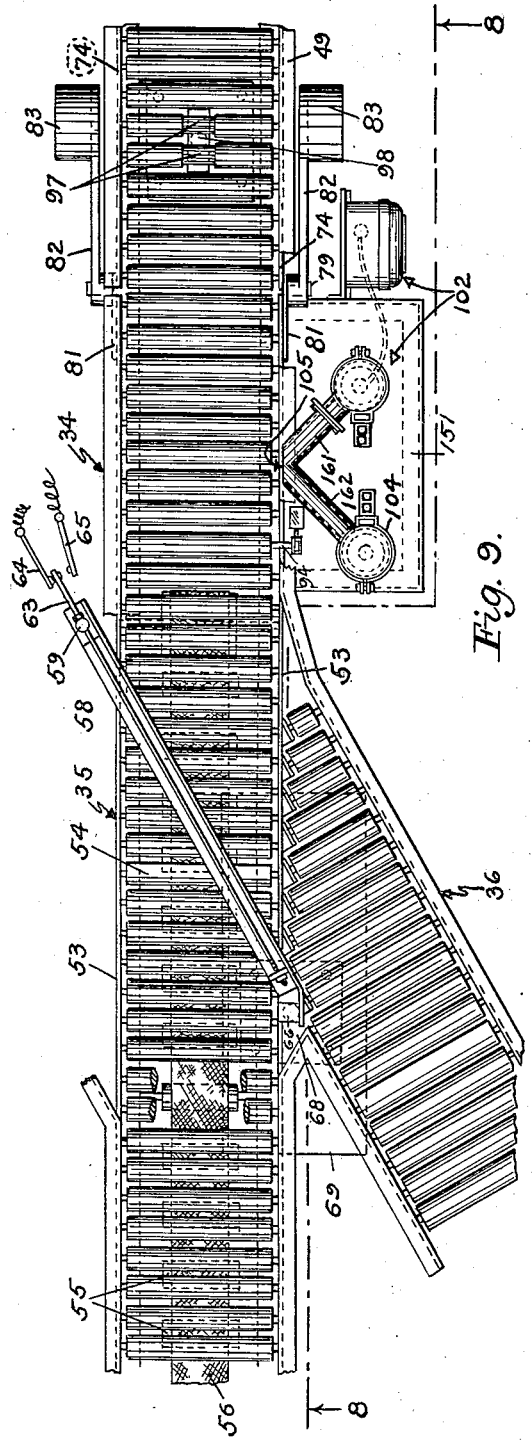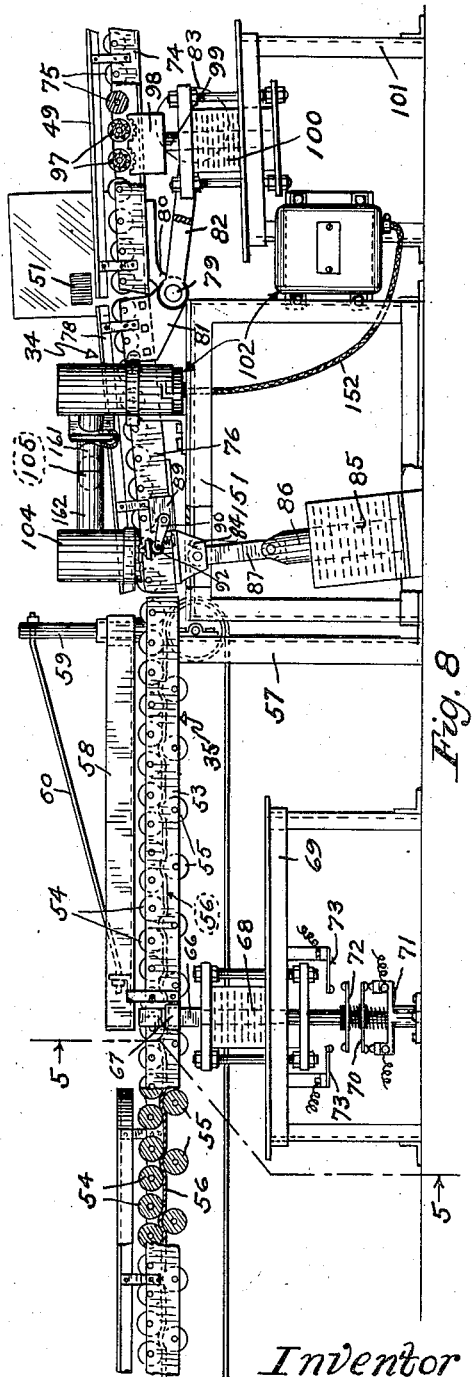

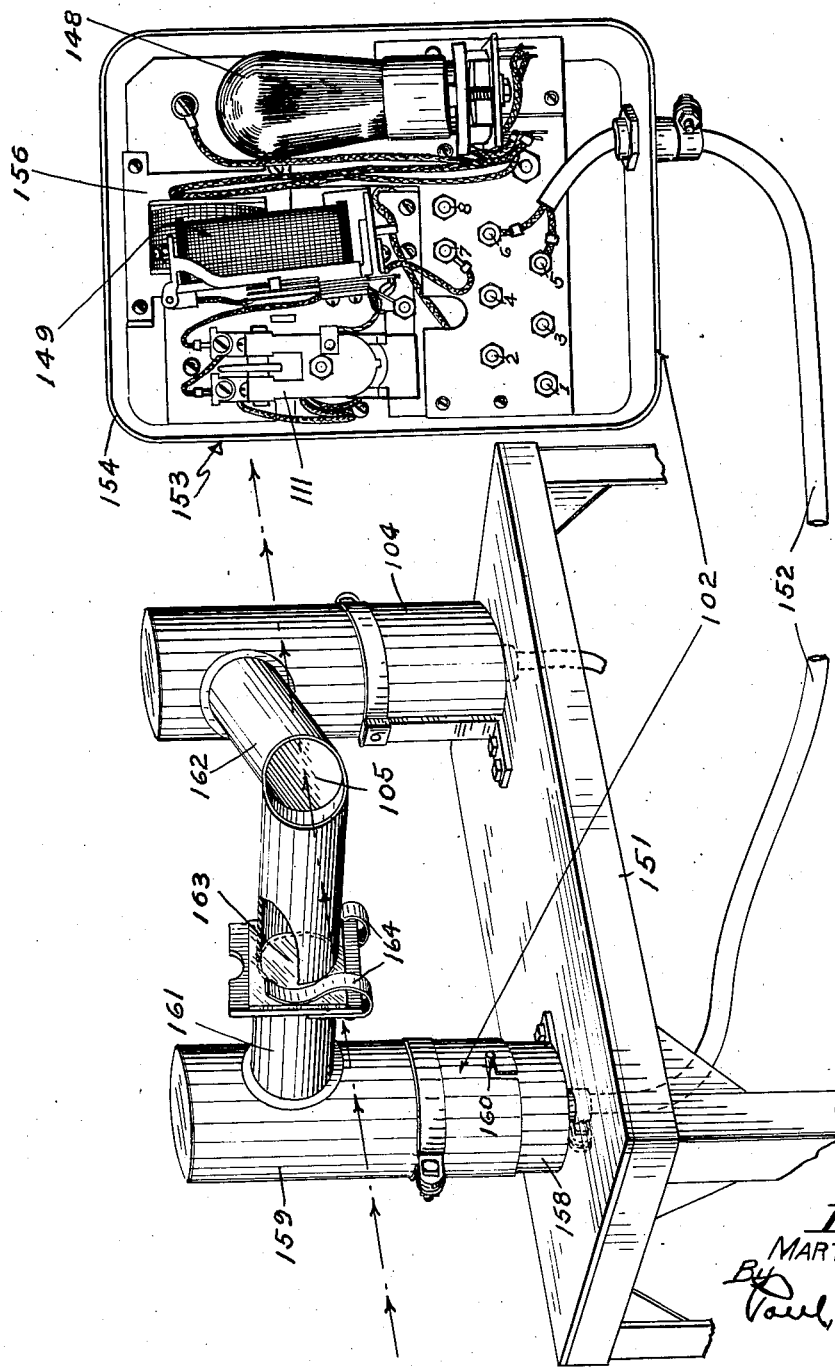

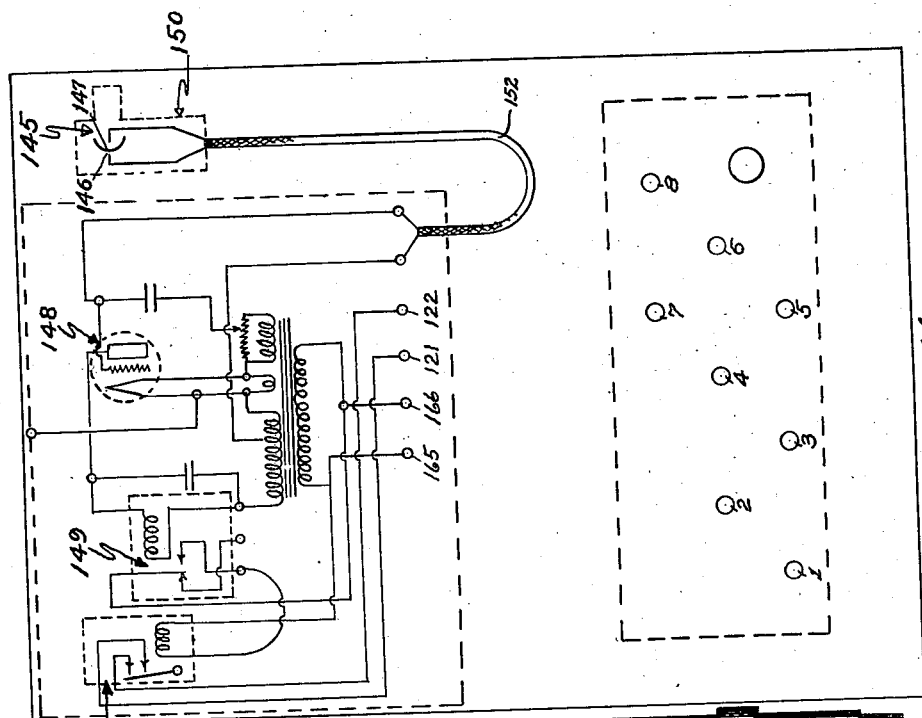
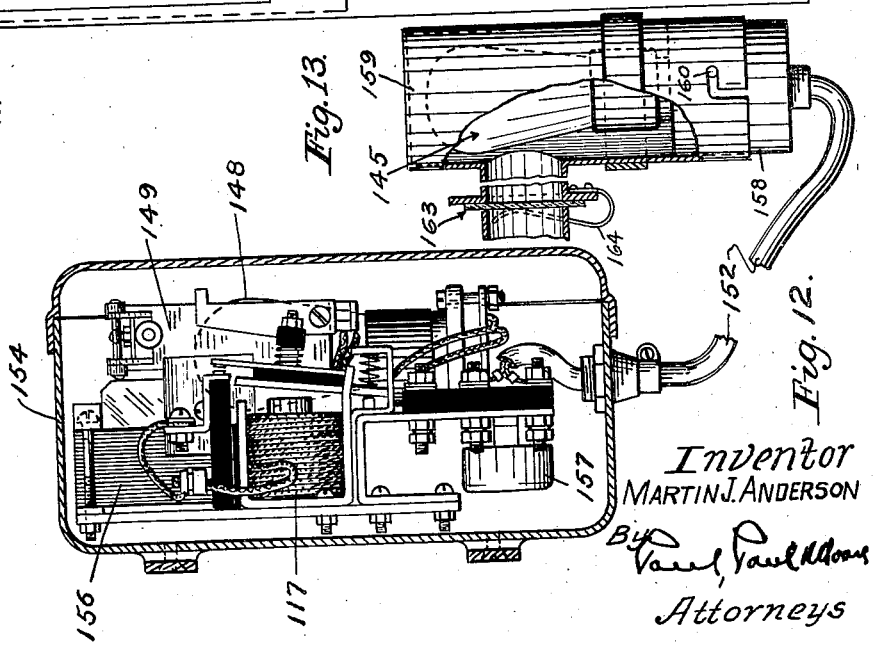

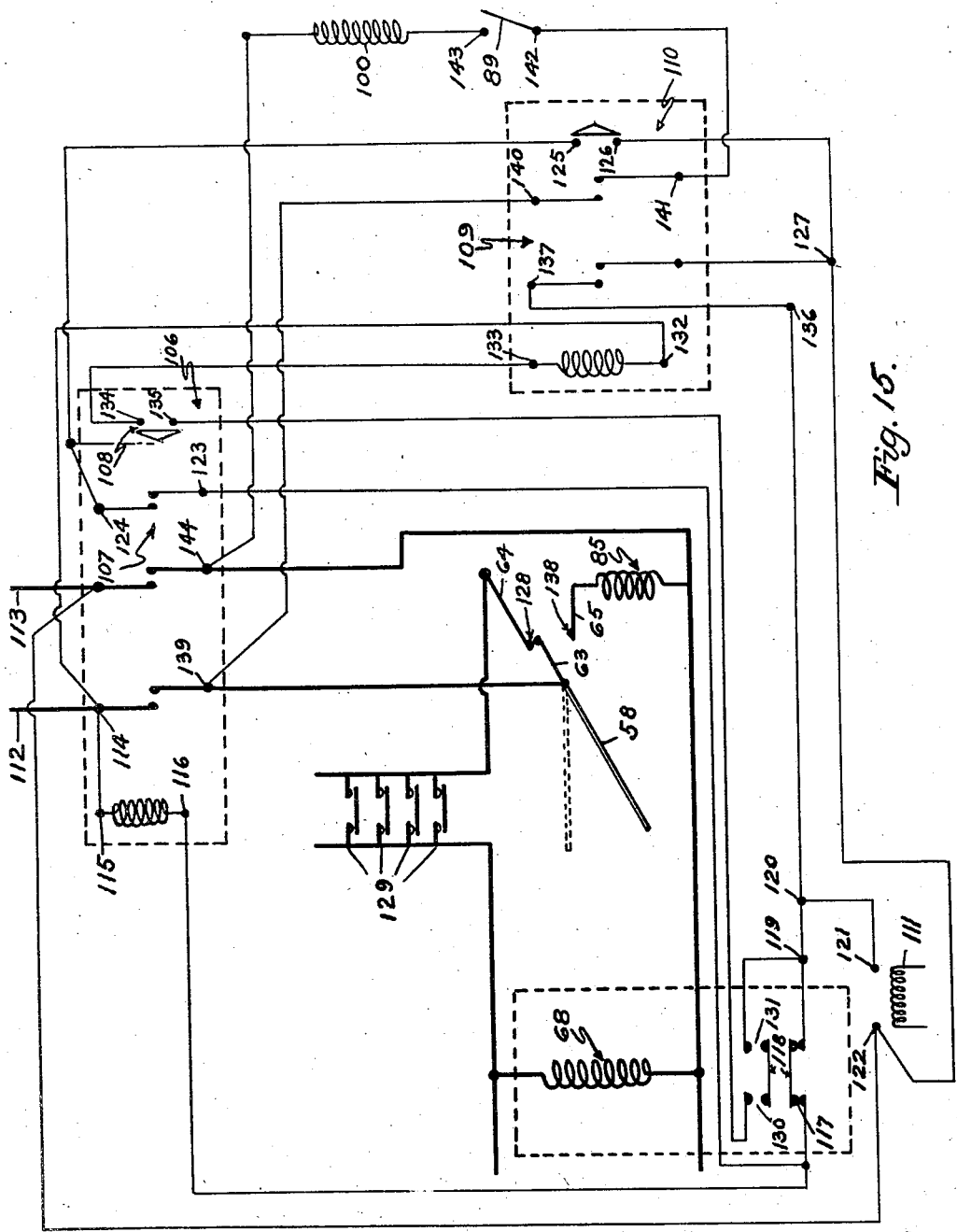

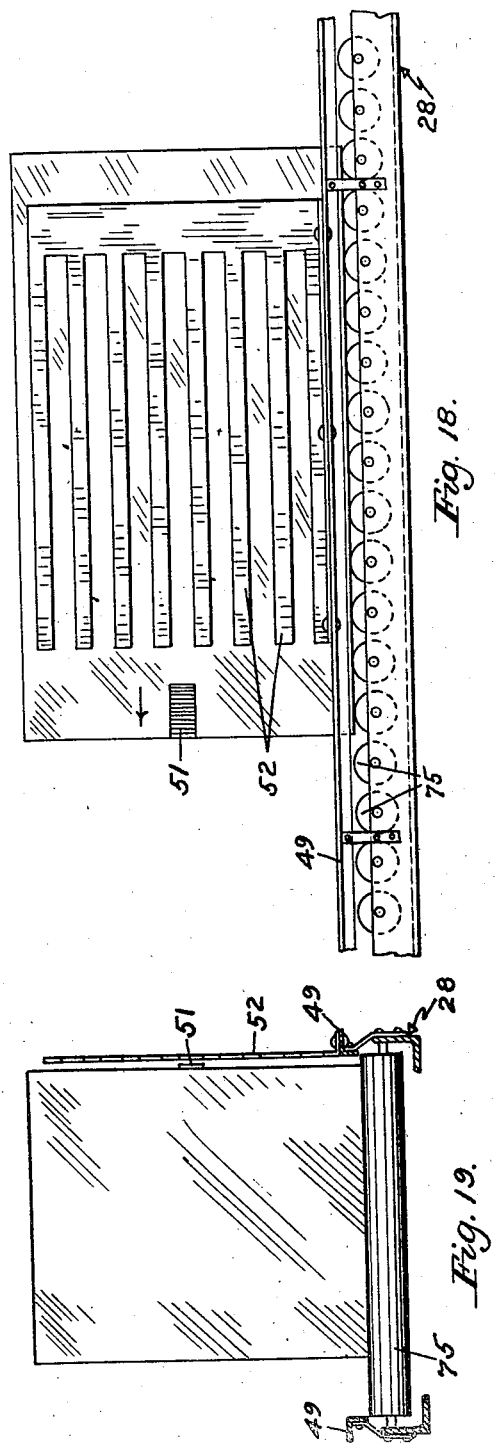
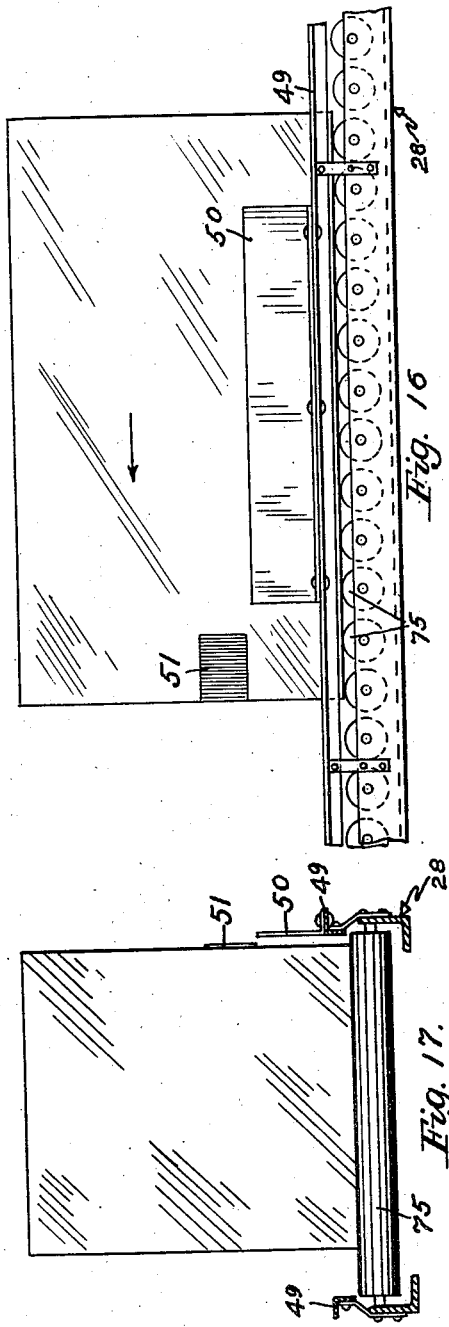
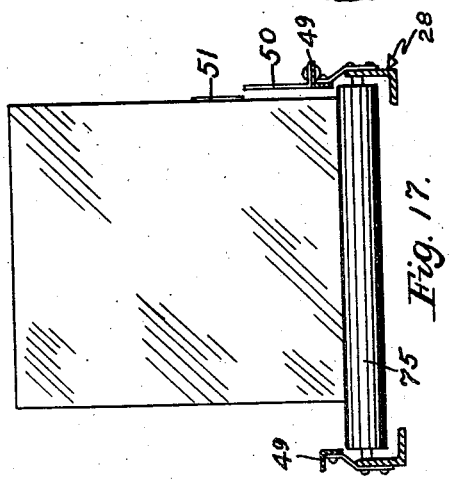

Patented Feb. 26, 1935

1,992,686

UNITED STATES PATENT OFFICE 1,992,686

SELECTIVE DISPATCH AND AUTOMATIC DEFLECTOR CONTROL MECHANISM

Martin J. Anderson, Ellwood City, Pa., assignor to Mathews Conveyer Company, Ellwood City, Pa., a corporation of Pennsylvania Application March 7, 1930, Serial No. 433,999

20 Claims. (Cl. 198—38)

The present invention relates to improvements in conveyer systems and has more particular reference to a complete electrical system for selectively determining from a central dispatching station the routing of commodities over a conveying system to predetermined stations where the commodities are selectively and automatically deflected from the main conveying system to branch conveying systems or storage lines.

The present selective dispatch and automatic deflector control mechanism for the diverting of commodities from a distributing conveyer to any one of a plurality of branch lines is a departure from the various mechanical and electrical systems heretofore in use, the system having been designed with the object of making it applicable to many conveyer installations now in use without the addition of return systems, and with the elimination of all pilot devices.

Among the many advantages gained by employment of the system of the present invention, the following may be mentioned: (a) the duties of the operator at the dispatching station are simplified; (b) the capacity of the system is increased; (c) the separating or spacing apart of different consignments is accomplished only under certain conditions to eliminate the spacing apart of all of the consignments; (d) all of the mechanisms of the present system are greatly simplified; (e) and greater flexibility than has heretofore been inherent in systems of the present general character is obtained with fewer working parts.

The general object of the invention is to provide an all-electric conveying system wherein means will be incorporated for dispatching consignments or commodities from a given location to any one of a plurality of different locations in the conveying system, and adapted to function to selectively route the different commodities or consignments, to automatically deflect each commodity or consignment at its proper station, and to automatically space the different commodities or consignments from each other when, and only when, this is necessary.

The present conveying system differs from other systems heretofore known by reason of the fact that all pilot devices are eliminated from the present system, the cost of the system is reduced due to the elimination of return systems for pilots, unvarying operation of all of the mechanisms of the system is accomplished at the proper time without necessity for the use of timing devices, and on the whole there is in the system of the invention a greatly increased efficiency over conveying systems heretofore in use.

In the accompanying drawings forming a part of this specification,

Fig. 1 is an elevational view of a selective dispatch and automatic deflector control system in which the features of the invention are incorporated, disclosing the principal conveyers of the system, which may be located on the first, second and third floors of a building;

Fig. 2 is a plan view, taken as on line 2—2 in Fig. 1, disclosing features of the system located upon the first and second floors of the building;

Fig. 3 is a plan view, taken as on line 3—3 in Fig. 1, disclosing features of the system located upon the second floor of the building;

Fig. 4 is a plan view, taken as on line 4—4 in Fig. 1, disclosing features of the system located upon the third floor of the building;

Fig. 5 is an enlarged transverse sectional view of the deflector mechanism disclosed in Figs. 8 and 9, taken on line 5—5 in Fig. 8;

Fig. 6 is an enlarged transverse sectional view of the spacing device of the control mechanism disclosed in Figs. 8 and 9, taken on line 6—6 in Fig. 7;

Fig. 7 is a side elevational view of the spacing device of Fig. 6, as seen on line 7—7 in said Fig. 6;

Fig. 8 is an elevational view of any one of the automatic deflector control mechanisms of the invention, taken on line 8—8 in Fig. 9;

Fig. 9 is a plan view of the mechanism of Fig. 8;

Fig. 10 is a perspective view of the photoelectric tube housing, light housing, and light shield;

Fig. 11 is an elevational view of the photoelectric cell unit with which the elements disclosed in Fig. 10 cooperate, the cover of the unit being removed;

Fig. 12 is a transverse sectional view of the unit of Fig. 11;

Fig. 13 is a detail view of the photo-electric tube and associated parts;

Fig. 14 is a diagrammatic view of the wiring system of the unit of Figs. 11 and 12; also disclosing diagrammatically the photo-electric tube, and its manner of association with the unit;

Fig. 15 is a diagrammatic view of the wiring system of the automatic deflector control mechanism of Figs. 8 and 9;

Fig. 16 is an enlarged elevational view of the dispatching conveyer at the operator's station, disclosing a guide for assisting the operator in applying the stickers to the conveyed articles at a fixed and predetermined elevation;

Fig. 17 is a transverse sectional view of the disclosure of Fig. 16;

Fig. 18 is an enlarged elevational view of the dispatching conveyer at the operator's station, disclosing a modified type of guide to assist the operator in applying the stickers at proper elevation one above the other; and Fig. 19 is a transverse sectional view of the disclosure of Fig. 18.

With respect to the drawings and the numerals of reference thereon, 25 indicates an incoming conveyer which transports commodities or consignments from one or more sources of supply to the dispatching conveyer of the invention. The incoming conveyer 25 may be of gravity type, or a power conveyer may be used in some cases, according to the requirements of the commodities or consignments to be conveyed or the limitations of the building or other conditions. A short belt or live roller conveyer 26 forms a connecting link between all incoming conveyers from the different sources of supply to the dispatching conveyer of the invention. The short belt or live roller 26 also aids in proper control and delivery of commodities or consignments from incoming conveyers 25 and 27 to the main dispatching conveyer. Numeral 27 indicates a conveyer which transports commodities or consignments from an additional source of supply. The present conveyer may be similar to the conveyer 25.

Numeral 28 indicates the dispatching conveyer, and 29 represents the dispatcher's station. A junction point 30 on the dispatching conveyer, or at some location on the main conveyer, is clearly visible to the operator at the dispatcher's station. At the junction point 30, a switch unit is installed, a three-way switch in the present instance, which forms a connecting link between the dispatching conveyer and any one of the three floors shown in the drawings at the will of the operator. The switch unit disclosed may be supplemented by changing the conveying system ahead of the dispatching conveyer to a continuous system having branch conveyers each equipped with an automatic deflector control mechanism made according to the invention, and as hereinafter to be fully described, leading in any direction, as, for example, to one or more floors above and/or below. Variation in equipment or arrangement will be essential to meet varying conditions and to accommodate the different commodities or consignment which it is desired to handle.

Numeral 31 designates a connecting section or a suitable type of power conveyer, arranged on the second floor as shown, and situated adjacent the junction point 30. Said section or conveyer 31 leads to a belt, live roller or other type of power conveyer, 32, also on the second floor. Where conditions permit, the element 32 may be an inclined or gravity conveyer. Where a power conveyer is utilized, it may be used to raise the commodities or consignments to a proper elevation for distribution. A gravity conveyer 33 leads from the conveyer 32 to an automatic spacing device 34 for the purpose of insuring a fixed space between a following consignment and the last commodity of a foregoing consignment. This spacing device 34 is entirely automatic and operates only when the spaces between commodities or consignments are not sufficient for the free operation of the deflectors of the automatic deflecting units designated 35, all as will hereinafter be fully set forth. The deflecting units 35 are for the purpose of diverting commodities or consignments from the main conveyer to branch or storage lines 36, or for diverting commodities or consignments from a branch or storage line having a plurality of branch lines. Numeral 37 indicates a continuation of the main conveyer to some distant point (not shown). Each branch or storage line 36 may be equipped with electrical protective switches to insure against a surplus of commodities.

A pusher-bar elevator 38 is for raising commodities or consignments to a sufficient elevation above an upper floor to insure proper elevation for distribution. The elevator 38 is located adjacent the junction point 30, and may be of either inclined or vertical type, and in some cases may be supplemented by an electric hoist or straight lift elevator. The elevator, as in the instance shown, acts as a spacing device for commodities or consignments. The pusher-bar elevator 38 leads to a distributing conveyer 39, on the third floor as shown, which may be a belt, live roller, chain, or other suitable type of power conveyer. When preceded by a power unit which will evenly space the commodities or consignments, an additional spacing device is not required at a deflector, as on the third floor. Numeral 40 indicates the locations of automatic deflecting mechanisms for diverting commodities or consignments carried ahead by the distributing conveyer 39 to branch or storage lines 41.

Numeral 42 represents a gravity conveyer section leading from the junction point 30 to a belt conveyer 43, the first part of which is inclined for the purpose of lowering commodities or consignments to proper elevation for discharging on a lower floor, the first floor as shown. The last part of the belt conveyer 43 is used as a distributing conveyer, being snubbed down to allow sufficient space for the installation of spacing and deflecting mechanisms and a short section of gravity conveyer. It will be noted by reference to the left hand side of Fig. 2 of the drawings, that the deflecting mechanisms can be so arranged that commodities or consignments can be deflected from either side of the conveyer.

The branch or storage lines 36 may be used to convey commodities to any location, as, for example, to another floor or to another building. Numeral 44 indicates an incoming line, in addition to the incoming lines 25 and 27, which may lead from any source of supply.

In the operation of the novel system the dispatcher is located at the dispatching station 29 and is responsible for the operation of the entire conveying system from the point where the incoming commodities or consignments from the sources of supply 25, 27 and 44 are diverted onto the dispatching conveyer 28, through to the end of the present system. Should the system reach such proportions that one operator could not efficiently dispatch commodities over the entire system, it would then be separated into two or more divisions having an operator for each division. The routing of the commodities or consignments is determined by the colors or the positions of stickers, or other suitable markers, placed at predetermined locations, preferably on a side of a commodity, the side to have the sticker being determined by whether the commodity is to be diverted from the distributing conveyer to a branch line conveyer located on the right or left hand side of the distributing conveyer. The stickers or other markers may be placed upon the tops of the commodities in cases where the commodities to be conveyed are of a nearly uniform height.

The dispatcher, when dispatching a single commodity or a consignment of commodities to any predetermined branch line 36, or direct to some other location over line 36 or 37, would release a stop in incoming conveyer 25, 27 or 44, depending from which source of supply he desires to receive the commodities or consignments. The stop, which is remotely controlled by the operator at the dispatching station, is allowed to remain released until the desired number of commodities, to make up a consignment, have been received onto the dispatching conveyer 28. Upon deciding at which deflecting station 35 or 40 the consignment is to be deflected to a branch line 36 or 41, or to some distant point over line 36 or 37, the dispatcher selects a colored sticker of the proper color to actuate a photo-electric cell, in a manner hereinafter to be described, at that particular deflecting station. As the first commodity of the consignment is passing the dispatcher, he places a sticker of predetermined color at a predetermined location on the side of the commodity. His next operation is to move the remotely controlled switch at junction point 30 to the proper position so that the commodities or consignment will be diverted from the dispatching conveyer to the proper distributing conveyer. Assuming that the consignment is designated to be deflected at station 45 on the third floor, the switch at the junction point 30 is moved to its upper position. After a sticker of proper color has been placed on the first commodity of the consignment, the commodities are diverted to the inclined elevator 38 and are raised by said elevator, evenly spaced, to distributing conveyer 39 upon the third floor. All of the deflectors in advance of the station 45, as well as all others of the deflectors of the present improved system, are normally closed and unlatched, and the passing commodities or consignments swing the deflectors open as they pass, the deflectors returning to closed position upon clearance of the commodities or consignments.

As the commodity carrying the colored sticker approaches deflecting station 45, the sticker is illuminated and reflects a beam of light back into the window of a photo-electric cell, thus actuating the cell, which in turn, through a series of relays, closes a solenoid circuit and latches the deflector just before the commodity reaches it. The commodity or consignment being conveyed past the latched deflector is thus diverted to the corresponding branch line. As the last commodity passes the operator, he places a sticker on it in the same relative position as on the first commodity of the same consignment. The action of the last sticker upon a commodity or consignment is to unlatch the deflector after passing it, the time interval elapsing before the deflector is unlatched depending upon the speed of travel and the length of the commodity or consignment being conveyed. Upon being released, the deflector remains in its normal unlatched position.

Next will be considered the conveying and deflecting of commodities or consignments and the resulting operations by a routing over the second floor system. Say that the dispatcher places upn the first commodity of a consignment reaching the dispatching station a sticker of proper color to actuate the photo-electric cell at station 46 on the second floor, to thus deflect the consignment at this station. The three-way switch at the junction point 30 is moved to its central position, and the commodities are thus conveyed to gravity section 31, inclined belt conveyer 32, gravity section 33, hinged gravity section or spacing device 34, live roller conveyer section 35, again over duplicate sections 33, 34, and 35 at station 47, then over sections 34 and 35 at which the sticker passes the photo-electric cell at station 46 which will respond to the color of the sticker placed on the commodity considered. The action of the photo cell and relays causes the deflector at station 46 to be latched, and the commodity or consignment is diverted to the corresponding branch or storage line 36. By placing a sticker upon the last commodity designated for station 46, the deflector is unlatched in the manner as previously described. It is to be noted that the hinged gravity section 34 did not function as a spacing device during the deflection of the commodity or consignment at the station 46 as just described, but did function as a short section of gravity carrier, as will be more fully hereinafter explained.

Now will be considered the conveying and deflecting of two consignments. Say that the first consignment is to be conveyed to line 37 on the second floor. There being no deflectors shown on line 37, no sticker will be required for this consignment. The route will be as before, by the switch section at junction point 30, gravity conveyer 31, belt 32, and through the three deflecting units, the commodities or consignments merely swinging the deflectors open and passing on. Say that the next consignment is to be diverted to a branch line at deflecting station 46. Consider the two consignments of commodities as one continuous line with little or no space between commodities, the only distinction between the consignments being that a sticker of the proper color to actuate deflecting station 46 is placed on the first commodity of the second consignment. Consider now that the last commodity of the first consignment is holding open the normally closed deflector at station 46, and also consider that the first commodity of the second consignment, immediately following the last commodity of the first consignment, is to be diverted to the branch or storage line at station 46 at the same time. The sticker on the first commodity of the second consignment reflects a light into the photo-electric cell, thus tending to latch the then open deflector. It is evident that this first commodity of the second consignment must be held in, or ahead of, its present position until the last commodity of the first consignment has been conveyed a sufficient distance to allow the deflector to swing to its normal closed position to become latched. The hinged gravity section or spacing device 34 is for accomplishing this purpose. The spacing device 34 consists of a hinged section of gravity carrier, which normally functions as a section of gravity carrier, but in the case described, the lower end of this section would be drawn downward a sufficient distance to cause the following section 35 to act as a stop holding back the commodities only until the deflector swings back to its normal position. At this time the spacing device or hinged gravity section 34 is automatically restored to its normal position, and at the same time the deflector is latched and the first commodity of the second consignment is immediately conveyed over the live roller conveyer unit against the latched deflector and diverted to the corresponding branch line 36, the deflector remaining latched as before described until the last commodity of the consignment has been diverted a sufficient distance so that its normal travel would be along the said branch line 36. The arrangement is such that the deflector is unlatched in sufficient time to allow the third consignment destined for line 37 to swing open the deflector.

Consider now a third consignment destined for line 37. Assuming that the last commodity of the second consignment as just described is very closely followed by the first commodity of the third consignment, just as the sticker on the last commodity of the second consignment reaches the photo-electric cell to actuate the mechanism to unlatch the deflector after the proper time interval, a brake or friction device is simultaneously applied to a plurality of rollers under the first commodity of the third consignment to hold this commodity for a sufficient time interval to allow the last commodity of the second consignment to be diverted and the deflector to unlatch before the first commodity of the third consignment reaches the deflector. By this arrangement, a commodity destined to be conveyed past a station will never run into a latched deflector to be deflected.

Supposing that the dispatcher receives a consignment of commodities destined for the adjacent building via the first floor conveyer, and assuming that line 36 adjacent station 48 on the first floor leads to said adjacent building, upon receiving the first commodity of the consignment the dispatcher places a sticker of proper color thereon to actuate station 48, moves the three-way switch at the junction point 30 to its lower position, thus diverting the commodity to gravity conveyer 42 and belt conveyer 43 the first section of which acts as a descending belt to lower the commodities to the lower floor elevation. The second section of the belt conveyer 43 acts as a distributing conveyer. Said belt 43 is snubbed in such manner as to allow the incorporation of a deflecting station with a spacing device at the station 48. The first commodity of the consignment in question having reached the deflecting station 48 after the last commodity of any preceding consignment has passed by the deflector and allowed it to swing to its normal position, said first commodity of the consignment in question will actuate the photo-electric cell of said station 48 and cause its deflector to be locked to divert the commodities of the consignment to the corresponding branch line 36.

With reference to the plan of actuating a plurality of selective automatic deflectors so arranged that each deflector unit will respond or function to only one distinct color of sticker placed on the first and last commodity of a consignment, this result is accomplished by using a color of sticker for the first deflecting station approached which will by its reflection cause the photo-electric cell of that station to give its greatest response. By calibrating the station relay to this response, a weaker color passing the station will not cause it to function. The second deflecting station approached includes a deflector unit set to respond to a sticker giving an intensity of light reflection a step lower than the sticker used for operating the first deflecting station. This same scheme is carried through to the last station approached which is operated by a sticker of such a color that the weakest reflection of light intensity is secured, so that the sticker designed to actuate the deflecting unit at the last station will not cause the deflecting units of any other stations passed to be actuated.

With more particular reference to Figs. 7, 8, 9, 16 and 17, numeral 49 represents suitable guard rails upon the dispatching conveyer 28. Said dispatching conveyer 28 may be supported in any convenient manner. The guard rails 49 are used to prevent the commodities or consignments from running off of the rollers. A sheet metal plate 50 is secured to a guard rail 49 at the location of the dispatcher's station 29 to serve as a guide for the dispatcher so that he may place all of the stickers, designated 51, at approximately the same elevation.

A modified arrangement for applying the stickers 51 is disclosed in Figs. 18 and 19. In the present instance, all of the stickers are of the same color but are placed on the commodities or consignments at different elevations and the photo-electric cells at the different dispatching stations are set at different elevations, to include a photo-electric cell in alinement with each one of the stickers utilized. For example, assuming that the window of a photo-electric cell is three inches above the elevation of the rollers of the conveyer, the dispatcher when desirous of diverting a commodity or consignment to the branch line at said station will place a sticker on the commodity or consignment approximately three inches upward from the bottom thereof so that the sticker will pass the window of the photo-electric cell which is set at this same elevation. To actuate a photo-electric cell the window of which is set at four inches above the elevation of the conveyer rollers, the dispatcher places a sticker four inches above the bottom of the commodity or consignment, and so on. That is to say, by setting the height of the windows of the photo-electric cells at different elevations each corresponding to the elevation of a sticker, the plurality of deflecting stations for the system will be limited only by the minimum height of the commodities or consignments to be conveyed. As shown in Figs. 18 and 19, 52 designates a sheet metal plate stamped out to leave a fingerlike arrangement with spaces between the fingers. As a commodity or consignment passes or is stopped at the dispatcher's station before this fingerlike arrangement, the dispatcher places a sticker on a commodity by using the spaces between the fingers as a guide for placing the sticker at the proper elevation. It is apparent from Fig. 18 that at least seven stickers 51 can be placed on the commodities at different elevations, using the plate 52 as a guide.

It will be evident that the sticker arrangement as shown in Figs. 16 and 17 can be coupled with the arrangement as shown in Figs. 18 and 19 to provide a conveying system having as many as forty-nine different automatic selective deflector stations, providing the stickers as used in Figs. 16 and 17 are of seven different colors and the stickers as used in Figs. 18 and 19 are at seven different elevations. The number of stations could be further increased by so arranging the photo-electric cells that any one of the stations of the system could be controlled by placing a sticker of proper color at the proper position on one side or the other of the commodity. The stickers may be placed upon the commodities either manually or mechanically. Clearly, said stickers need not necessarily be placed upon the sides of the commodities. They could be placed upon the tops, ends, or bottoms of the commodities.

Referring more particularly to Figs. 5, 8, and 9, each deflecting unit 35 includes frame rails 53, live rollers 54, snub rollers 55, and live roller drive belt 56. The parts of each deflecting unit as just described are an ordinary portion of the conveying system which may be supported in any suitable manner as by the frame 57. A deflector 58 is secured to a vertical shaft 59 and is braced from said shaft by a sag-rod 60. Shaft 59 is free to rotate in two suitable anti-friction bearings 61, said bearings being secured by a U-shaped plate 62 to a frame rail 53. Suitable stops (not shown) will be provided to limit the swing of the deflector in either direction.

It is to be understood, of course, that the construction and operation of the deflector may be varied to suit particular conditions or preferences. Thus, the deflector may swing either on a horizontal or a vertical axis, or it may slide into and out of operative position. Moreover it is not essential for the purposes of my invention that the deflector shall be a device which passively offers resistance to the passage of the commodities; a device may be employed which will actively engage the commodities and eject them from the conveyer to the branch conveyers. Therefore, I wish it to be understood that where I use the word "deflector" I intend it to mean any device which either passively or actively effects transfer of the commodities from a conveyer to a branch conveyer.

A single pole double throw switch 63 is suitably secured to the shaft 59 and extends in direction therefrom opposite the deflector 58. The switch 63 makes contact with a contacter 64 when the deflector 58 is in its normal position, and when the deflector is swung across the conveyer, said switch breaks engagement with the contacter 64 and engages the contacter 65. Additional swing of the deflector after the contacters 64 and 65 are engaged by the switch 63 is compensated for by any suitable spring arrangement allowing said contacters to yield under sufficient pressure applied by said switch, as will be obvious.

A deflector latch 66 is guided by a U-shaped plate 67 suitably secured to a frame rail 53. The latch 66 is mounted for vertical movement. A lower portion of the deflector latch 66 is arranged in a solenoid 68 which when energized will lift the latch from its position as indicated in Figs. 5 and 8 to a position whereby the upper extremity of the latch will prevent swinging of the deflector 58 transversely of the conveyer. The solenoid 68 may be supported in any suitable manner, as by a frame 69. The solenoid core supports a double contacter switch 70 which engages contacters 71 when the solenoid 68 is de-energized and the deflector is unlatched, and also supports double contacter switch 72 which engages with contacters 73 when the solenoid is energized and the deflector is latched. The contacters 71 and 73 may be fixedly mounted while the switches 70 and 72 are arranged for resilient movement upon engagement with the contacters under pressure.

Referring more particularly to Figs. 6, 7, 8, 9, the portion of the conveyer adjacent the spacing device 34 is composed of stationary frame rails 74 in which rollers 75 are mounted. The stationary frame rails 74 may be supported in any suitable manner. Guard rails 49 desirably extend along the full length of the stationary frame rails 74.

The spacing device or hinged gravity section 34 consists of frame rails 76 supporting rollers 77 and also supporting guard rails 78. A shaft 79 is journaled by dead eyes 80 which are suitably secured to the frame rails 74. Hinged plates 81 are suitably secured to the outer sides of the frame rails 76, and the shaft 79 extends through and is welded to adjacent portions of said hinged plates, so that the hinged section and the shaft are rigidly secured together and the shaft is free to rotate in the bearings or dead eyes 80. A counterbalancing arm 82 is secured to each extremity of the shaft 79, and each arm 82 supports a counterbalancing weight 83 of sufficient magnitude to hold the hinged section at its normal or elevated position as shown in Fig. 8. Suitable stops may be provided to limit the travel of the hinged section.

A plate 84 is suitably secured to the bottoms of the end portions of the frame rails 76 opposite the shaft 79. Numeral 85 represents a pull type solenoid having a core 86. A link 87 couples the solenoid core 86 and the plate 84 together. The solenoid 85 may be mounted on the floor, as shown in Fig. 8, or upon any other suitable support.

A plate 88 suitably secured to the bottom of a frame rail 76 supports a small wheel type normally open limit switch 89 having an arm 90 held in elevated position by a spring 91. A small roller 92 is secured to the outer extremity of the arm 90, and a small square of machine steel 93 rests on the roller 92 and is welded to the extremity of the axle 94 upon which axle the roller 95 is free to rotate. The axle 94 is arranged in a vertical slot 96 in a frame rail 76. See Fig. 7. The arrangement is such that the end portion of the roller 95 adjacent the limit switch 89 will normally be held at a higher level than the adjacent rollers 77 but will be free to be moved down to the same level as said rollers 77 when sufficient pressure is applied, as, for example, by a commodity or consignment passing over the rollers. This switch arrangement can obviously be supplemented by any other suitable arrangement.

In Fig. 8 I have disclosed a brake for stopping or retarding the rotation of a plurality of rollers supported by the stationary frame rails 74 adjacent the spacing device or hinged gravity section 34. As there shown, rollers 97 are of special construction, each having a section in the center of the roller with corrugated periphery. A corrugated brake shoe 98 is secured to the upper extremity of a solenoid core 99 of a push type solenoid 100 which is suitably mounted on any convenient type of frame, for example, as disclosed at 101.

With respect to Figs. 8 and 9, 102 indicates, as a whole, the photo-electric cell unit, and 104 represents the lamp and lamp housing for illuminating a colored sticker as it passes the aperture 105 of said photo-electric cell unit.

Referring more particularly to Fig. 15, 106 represents a double pole magnetic contactor switch having an interlocking switch 107 in its secondary starting circuit with a time relay 108 so interlocked that its contacters will close from a fraction of a second to several seconds after the simultaneous closing of the main line contacters and interlocking switch 107. Numeral 109 designates a double pole magnetic contacter without an interlocking contacter, but with a normally closed relay 110 which will open several seconds after the closing of the double pole magnetic contacters. Numeral 111 indicates a relay to be actuated by the action of the photo-electric cell for momentarily closing the pilot circuit of the magnetic switch 106. In Fig. 15 the electrical equipment is shown diagrammatically. Electrical units of a standard make will be used.

Assuming that the deflecting station shown in Figs. 8 and 9 is one of a plurality of such stations in a complete conveying system, and that a consignment of commodities is destined to be diverted from the main conveyer to the branch line 36, as the first and last commodities of the consignment passed the dispatcher at the dispatching station, a colored sticker suitable to actuate the photo-electric cell of said deflecting station was pasted on the said commodities in the predetermined position. The first commodity having reached the aperture 105 formed at the intersection of the light beam enclosing tubes, the colored sticker is illuminated by a beam of light from the lamp 104, and said beam of light is reflected or passed into the photo-electric cell. The photo-electric cell responds to the beam of light by passing a minute electric current which is amplified to a sufficient strength to cause the relay 111 to be actuated.

Referring to the wiring diagram in Fig. 15, 112 and 113 represent incoming power lines. Starting at the line 112, the secondary circuit will be considered. Terminal 114 is conductively connected to terminal 115 of the electro-magnetic coil of the magnetic contacter switch 106. Said coil terminates at 116 which is connected to terminal 117 of the lower normally closed switch 118 secured to the armature of the latching solenoid 68. The switch 118 terminates at terminal 119 which is connected to terminal 120, thence to terminal 121, which is one of the terminals of the relay 111 actuated by the action of the photo-electric cell. Terminal 122, the opposite terminal of the relay 111 is connected to line 113. As before stated, the sticker on the first commodity of a consignment in passing the aperture 105 of the light enclosing tubes actuates the photo-electric cell the current from which is amplified to a sufficient strength to close the contacts of the relay 111, completing a circuit from incoming line 112 through 114, 115, 116, 117, 118, 119, 120, 121 and 122 back to the line 113, and energizing the electro-magnet between the terminals 115 and 116, thus closing the two main line contacters and the interlocking switch 107. As soon as the sticker passes beyond the aperture 105, the relay 111 is de-energized and the contact between 121 and 122 is broken, but the secondary circuit is still complete from incoming line 112 through 114, 115, 116 and 117, to terminal 123, through the inter-locking switch which terminates at terminal 124 and is connected to terminal 125 of the time interlocking switch 110 which terminates at terminal 126, thence to point 127, terminal 122, and back to the line 113. By this arrangement the contacters of switch 106 will remain closed until the circuit is opened by time inter-locking switch 110.

With the main contacters closed, the primary circuit is complete through the switch 63 making contact at 128, due to the deflector being in its normal position, from 128 through any one or all of the line protection switches 129, through the solenoid 68 and back to line 113, thus energizing the latching solenoid which in turn locks the deflector 58. The commodities are now diverted from the main conveyer to branch line 36. The deflector remains latched until the last commodity has been deflected before the latching solenoid 68 is de-energized by the following action.

As the core of the solenoid 68 raised to latch the deflector, the contacts 117 and 119 of the switch 118 were opened, and contacts 130 and 131 were closed and remain closed during the time the deflector is latched. Now starting at terminal 114 of incoming line 112 another circuit is made to the right from 114 to terminal 132 at the lower extremity of the electro-magnetic coil of magnetic switch 109, to the upper terminal 133 of said coil, thence to terminal 134 of the time interlocking switch, which is now closed, through said switch to terminal 135, thence to terminal 130 of switch 118 which being closed completes the circuit to terminal 131, thence to 119 and 120, and thence to terminal 121. As the sticker on the last commodity of the consignment actuates the photo-electric cell and the relay 111, the terminals 121 and 122 are bridged electrically and the circuit is complete back to the line 113, thus completing the secondary circuit from line 112 through the magnetic coil between the terminals 132 and 133, time interlock 108, switch 118, relay 111, and back to the line, energizing magnetic coil of switch 109 which by its action closes the contacters and completes the secondary circuit for switch 109, starting at terminal 114 on incoming line 112 through 132, 133, 134, 135, 130, 131, 119, 120, 136, 137, 127 and 122, back to line 113, thus holding the contacters of switch 109 closed. These contacters will remain closed for several seconds as determined by the setting of the time interlocking switch 110, and said interlocking switch is set to open just as the last commodity is completely deflected onto branch line 36. The opening of the time interlocking switch 110 will cause all electrical parts in the entire deflecting unit to become de-energized, and all parts will automatically return to their normal de-energized positions.

Suppose that a consignment or commodity destined to some preceding station is being conveyed past the deflector 58 and that the last commodity of the consignment is holding the deflector open or partially open, and also suppose that another consignment of commodities is immediately following the first consignment and is to be diverted from the main conveyer to the branch line 36 by said deflector 58. The colored sticker on the first commodity of the second consignment reaches the aperture 105 of the light enclosing tubes and actuates the photo-electric cell. It is obvious that the first commodity of the second consignment will here be held stationary until the last commodity of the first consignment has been carried past the end of the deflector 58 to allow the deflector to swing back to its normally closed position where it can be latched. The deflector switch 63 breaks contact at 128 when said deflector is swung open and makes contact at 138 when only partially open. Now when the photo-electric cell is actuated by the sticker on the first commodity of the above mentioned second consignment, the contactors of the magnetic switch 106 are closed. The primary circuit is then complete from line 112 to switch 63 making contact at 138, through the solenoid 85 and back to the line 113, thereby energizing the solenoid 85 the upper extremity of the core of which is coupled to the free end of the hinged section 34, and resulting in the left hand end of said hinged section as in Fig. 8 being drawn downwardly a sufficient distance so that the aforesaid commodity upon moving onward will stop against the first roller of conveyer section or deflecting unit 35. The first consignment will continue to move without interruption during the operation just described. As the last commodity of the first consignment clears the outer extremity of the deflector 58, said deflector swings to its normal closed position, switch 63 breaks contact at 138, thereby de-energizing the solenoid 85 and allowing the hinged section 34 to be returned to its normal position by action of the counterbalancing weights 83. When the deflector 58 reaches its normally closed position, the switch 63 contacts at 128 completing the circuit through the latching solenoid 68, thus latching the deflector. It is thus obvious that the operation of the hinged section 34 as just described supplements a spacing device which would maintain a space between each commodity. The spacing operation in the present instance is entirely automatic and is accomplished in very efficient manner, the present spacing device operating only under conditions which require that a space be gained between consignments.

The operation of the roller brake which includes the corrugated brake shoe 98 is as follows. As the sticker on the last commodity of the second consignment reaches the aperture 105, the photo-electric cell is actuated and causes the relay 111 to close the secondary circuit and energize the magnetic coil of contacter switch 109, thus closing the contacters, as already described. Now, starting with terminal 139, which is the lower extremity of the contacter for incoming line 112, a circuit is traced through contacter terminal 140, contacter 141, terminal 142 of the roller switch 89, which if closed completes the circuit to 143, and thence through solenoid 100 and terminal 144 through the contacter 107 back to line 113. As the commodity or consignment moves forward over the floating roller of the switch 89, said switch is obviously closed and the circuit through the solenoid 100 is completed. Energization of said solenoid 100 raises the brake shoe 98 into engagement with the rollers 97 to thus retard any commodity upon said rollers 97. The brake 98 is located with respect to the length of a consignment so that the first commodity of the third consignment destined to some preceding station will be held, as will also all following commodities, until the last commodity of the second consignment has been diverted onto the branch line and the deflector has been unlatched. As all electric units of the deflecting station are de-energized simultaneously with the unlatching of the deflector, the brake is released when the deflector is unlatched, and the commodities move forward. It should be observed that the present brake arrangement is only effective when the first commodity of a following consignment is very close to the last commodity of a consignment being deflected.

The photo-electric cell unit 102 with housed illuminating lamp 104, as well as the relation of the various units 102 to the conveying system, is very clearly disclosed in Figs. 8 to 14.

Each unit 102 is operated by a change in light shining on the photo-electric tube 145. With a voltage of proper polarity and magnitude applied between the elements 146 and 147 of the photo-electric tube 145, the current through the tube is proportional to the amount of light shining upon it. The magnitude of the current change through the tube is only a few microamperes. An amplifier utilizing a pliotron tube 148 is connected to the photo-electric tube to make this small change useful. The plate current of the pliotron changes according to the changes in the photo tube current, but in the magnitude of a few milliamperes. A sensitive relay 149 connected in the plate circuit of the pliotron is energized to close the relay 111 of Figs. 14 and 15, the terminals of which relay are connected with the incoming lines 112 and 113.

A receptacle 150 shields the photo-electric tube from any light other than the source intended to operate the unit. As disclosed, the unit 102 and the lamp 104 are suitably supported upon a table 151. A heavy rubber cable 152, usually four feet long, connects the receptacle 150 with the apparatus 153 in the steel box 154 containing the amplifier 148 and the transformer 156, as well as the remainder of the auxiliary equipment of the unit 102, including the relays 149 and 111.

A means of adjustment of each unit 102 is provided in a potentiometer 157 with which the bias potential on the pliotron 148 may be changed. The plate current can be increased to nearly the operating current of the sensitive relay, so that the slightest increase in light will energize said sensitive relay or a small decrease in light will de-energize it.

A transformer 156 is wound for a primary potential of 110 volts. The secondary is split into three sections, one section being used to obtain the bias voltage for the amplifying tube regulation, another section being used to light the filament, and the third section being used to furnish plate voltage for the tube.

The photo-electric tube housing unit is composed of two sections, the lower section 158 having a sliding fit into the upper section 159 and being held by a pin 160 as more clearly shown in Fig. 10. As disclosed, the lamp housing 104 is connected to the upper section 159 by light enclosing tubes 161 and 162 through which light is reflected from the sticker into the photo-electric tube. The light enclosing tube 161 includes a suitably arranged light filter 163 which is preferably readily detachable from the tube to be replaceable by other filters. The filter 163 may be held in the tube 161 in any suitable manner, as by spring clips 164.

Referring now to the wiring diagram of Fig. 14, when the moon-shaped element 146 in the photo-electric tube 145 is illuminated by a beam of light, it gives off a flow of electrons which migrate to the element 147, thus closing the gap between the electrodes 146 and 147 and permitting a minute flow of current across these electrodes. By this action, the circuit is closed from the transformer 156 to the photo-electric tube and back to the grid of the amplifying tube, causing the grid to become positive with respect to the filament, and a flow of the electrons from the heated filament to the plate. Due to the action of the impressed voltage on the plate, a minute current will flow from the plate to the filament. The winding of the sensitive relay 149 is in this circuit and will be energized by this flow of current. The relay armature will be drawn to the core of the electro-magnet to close its contacts and complete a circuit through the winding of the relay. Terminals 165 and 166 are connected directly to 110 voltage single phase power line. Simultaneously with the closing of the contacts of relay 149, the contacts of relay 111 will be closed, completing the circuit for terminal 121, through the closed contacts, and back to terminal 122.

As has been previously stated, as a sticker passes the aperture 105, it is illuminated and light is reflected into the photo-electric tube. The purpose of the light filters, such as 163, is to filter out the effective part of the rays reflected from the commodity and still permit the passage of the effective light rays from the colored sticker on the commodity into the photo-electric tube. The filters will desirably consist of gelatin cemented between pieces of optical glass, the edges of which are sealed to prevent moisture from damaging the gelatin filter. Referring more specifically to the arrangement and use of the colored stickers to be placed on the first and last commodity of each consignment, the first station of a system will be set by adjusting the potentiometer 157 at said station so that the desired bias voltage will be obtained to cause the unit to respond to the intensity of the light reflected from the sticker selected for the first station. This sticker will give the strongest reflection with respect to the light sensitivity co-efficient of the photo-electric tube. By similar adjustment at the second station of the system, the bias voltage of the photo-electric unit at this station will be set so that the unit will respond to a sticker giving an intensity of light reflection a step lower than the sticker used for operating the first deflecting station. The same scheme is carried through to the last station, where a sticker of such color is utilized that the weakest reflection of light intensity is secured to actuate the corresponding photo-electric unit set to respond to this minimum amount of current. The adjustment of the bias voltage can be made within very close limits, so that a photo-electric unit at an earlier station set to respond to a light intensity of greater magnitude will not respond to a weaker reflection of light designed to actuate a later or succeeding station.

It is to be understood that the photo-electric tube 145 and the lamp housing 104 can have relation to each other other than the relation disclosed. For example the unit 104 can be set at an angle of 90° to the commodity. A double convex focusing lens of the proper focal length can be inserted in the horizontal tube aperture of the light container. A collecting light lens can be inserted in the horizontal tube aperture of the photo tube container. Under such an arrangement, the possibility of mirror reflection from a sticker having a glossy surface is eliminated. The reflected light which will be focused on the photo-electric cell by the collecting lens will be purely a spectral reflection. The light filter will be secured to the end of the horizontal tube as previously described, and it will not be necessary to use light beam enclosing tubes such as 161 and 162 leading clear up to the stickers.

Though I have described with great particularity of detail an embodiment of my invention, yet it is not to be understood therefrom that the invention is restricted to the particular embodiment disclosed. Various modifications thereof in detail and in the arrangement of parts may be made by those skilled in the art without departing from the invention as defined in the following claims.

I claim as my invention.

1. In a conveying system, a conveyer, a branch conveyer leading therefrom, a member for deflecting commodities from said conveyer to said branch conveyer, a photo-electrically operated device for locking said member in deflecting position, including mechanism for releasing said member after it has caused a consignment of commodities to be deflected from said conveyer to said branch conveyer, means for actuating said device to lock said member consisting of a marker associated with said commodities, and means for actuating said mechanism to release said member consisting of a different marker associated with said commodities, said markers being movable with said commodities past said device.

2. In a conveying system, a conveyer, a branch conveyer leading therefrom, a member for deflecting commodities from said conveyer to said branch conveyer, a photo-electrically operated device for locking said member in deflecting position, including mechanism for releasing said member after it has caused a consignment of commodities to be deflected from said conveyer to said branch conveyer, means for actuating said device to lock said member consisting of a marker associated with said commodities, and means for actuating said mechanism after said commodities have cleared said deflector consisting of a marker associated with said commodities at the rear of the before mentioned marker, said markers being movable with the commodities past said device.

3. In a conveying system, a conveyer, a branch conveyer leading therefrom, a member for selectively deflecting commodities from said conveyer to said branch conveyer, a photo-electrically operated device for locking said member in deflecting position, and means for selectively actuating said device consisting of a marker of selected color associated with said commodities and movable past said device.

4. In a conveying system, a conveyer, a branch conveyer leading therefrom, a member for selectively deflecting commodities from said conveyer to said branch conveyer, a photo-electrically operated device for locking said member in deflecting position, including mechanism for releasing said member after it has caused a consignment of commodities to be deflected from said conveyer to said branch conveyer, and means for selectively actuating said device consisting of markers of selected color associated with said commodities and movable past said device.

5. In a conveying system, a conveyer, a branch conveyer leading therefrom, a member for selectively deflecting commodities from said conveyer to said branch conveyer, a photo-electrically operated device for locking said member in deflecting position, including mechanism for releasing said member after it has caused a consignment of commodities to be deflected from said conveyer to said branch conveyer, means for selectively actuating said device to lock said member consisting of a marker of selected color associated with said commodities, and means for actuating said mechanism to release said member consisting of a different marker of the same color associated with said commodities, said markers being movable with said commodities past said device.

6. In a conveying system, a conveyer, branch conveyers leading therefrom, a member adjacent each branch conveyer for selectively deflecting commodities from said conveyer to said branch conveyers, a photo-electrically operated device for locking each member in deflecting position, and means for selectively actuating any one of said devices, said means comprising markers of different colors movable with said commodities past said devices.

7. In a conveying system, a conveyer, branch conveyers leading therefrom, a member adjacent each branch conveyer for selectively deflecting commodities from said conveyer to said branch conveyers, a photo-electrically operated device for locking each member in deflecting position, and means for selectively actuating any one of said devices, said means comprising markers of different colors movable with said commodities past said devices, including a marker to which each one of said devices is responsive.

8. In a conveying system, a conveyer, branch conveyers leading therefrom, a member adjacent each branch conveyer for selectively deflecting commodities from said conveyer to said branch conveyers, a photo-electrically operated device for locking each member in deflecting position, and means for selectively actuating said devices, said means comprising markers of different colors associated with said commodities and movable past said device, one adapted to actuate each device, including a marker adapted to reflect light having a maximum intensity to actuate the first device approached, and a marker to actuate each succeeding device adapted to reflect light having less intensity than the intensity of light reflected at a preceding device.

9. In a conveying system, a conveyer, branch conveyers leading therefrom, a member adjacent each branch conveyer for selectively deflecting commodities from said conveyer to said branch conveyers, a photo-electrically operated device for locking each member in deflecting position, including mechanism for releasing the member after it has caused a consignment of commodities to be deflected from said conveyer to a branch conveyer, and means for selectively actuating any one of said devices consisting of markers associated with said commodities and movable past said devices, the markers for actuating each individual device having color different from all others of said markers.

10. In a conveying system, a conveyer, branch conveyers leading therefrom, a member adjacent each branch conveyer for selectively deflecting commodities from said conveyer to each of said branch conveyers, a photo-electrically operated device for locking each member in deflecting position, including mechanism for releasing the member after it has caused a consignment of commodities to be deflected from said conveyer to a branch conveyer, means for selectively actuating each of said devices to lock its corresponding member consisting of a marker associated with a consignment of said commodities, and means for actuating said mechanism to release said member consisting of a different marker associated with said consignment, said markers being movable with said commodities past said devices, and the markers attached to each different consignment of commodities having the same color but different from the colors of the markers associated with all other consignments of commodities.

11. In a conveying system, a conveyer, branch conveyers leading therefrom, a member adjacent each branch conveyer for selectively deflecting commodities from said conveyer to each of said branch conveyers, a photo-electrically operated device for locking each member in deflecting position, including mechanism for releasing the member after it has caused a consignment of commodities to be deflected from said conveyer to a branch conveyer, means for selectively actuating each of said devices to lock its corresponding member consisting of a marker associated with a consignment of said commodities, and means for actuating said mechanism to release said member consisting of a different marker associated with said consignment, said markers being movable with said commodities past said devices, and the markers attached to each different consignment of commodities having the same color but different from the colors of the markers associated with all other consignments of commodities, including a set of markers upon a consignment to be deflected to the first branch conveyer approached adapted to reflect light having a maximum intensity, and a set of markers upon each consignment to be deflected to a succeeding branch conveyer approached adapted to reflect light having less intensity than the intensity of light reflected at a preceding branch conveyer.

12. In a conveying system, a commodity transporting conveyer, a branch conveyer leading therefrom, a member for selectively deflecting certain of a plurality of commodities transported by said conveyer to said branch conveyer, said member being normally arranged in deflecting position and movable to non-deflecting position by commodities upon said conveyer carried past said member, means selectively actuatable to lock said member against movement when in deflecting position, a movable section at the rear of said member, and means for actuating said movable section to retard progress of a succeeding commodity intended to be deflected to said branch conveyer when said succeeding commodity approaches said member while held in non-deflecting position by a preceding commodity.

13. In a conveying system, a commodity transporting conveyer, a branch conveyer leading therefrom, a member for selectively deflecting certain of a plurality of commodities transported by said conveyer to said branch conveyer, said member being normally arranged in deflecting position and movable to non-deflecting position by commodities upon said conveyer carried past said member, means selectively actuatable to lock said member against movement when in deflecting position, a movable section at the rear of said member, means for actuating said movable section to retard progress of a succeeding commodity intended to be deflected to said branch conveyer when said succeeding commodity approaches said member while held in non-deflecting position by a preceding commodity, and means for actuating said movable section to permit progress of said succeeding commodity when said member is released by said preceding commodity.

14. The combination as specified in claim 13 wherein said means for actuating said movable section to retard progress of a succeeding commodity includes a solenoid adapted to be energized while said member is in non-deflecting position and to be de-energized when said member is in deflecting position.

15. In a conveying system, a commodity transporting conveyer, a branch conveyer leading therefrom, a member for deflecting commodities from said conveyer to said branch conveyer, means selectively actuatable to lock said member in deflecting position and to unlock the same when a selected consignment of commodities has been deflected, and photo-electric means operative when said member is locked in deflecting position to retard progress of a succeeding consignment until said member has been unlocked.

16. In a conveying system, a commodity transporting conveyer, a branch conveyer leading therefrom, a member for deflecting commodities from said conveyer to said branch conveyer, means selectively actuatable to lock said member in deflecting position and to unlock the same when a selected consignment of commodities has been deflected, and means operative when said member is locked in deflecting position to retard progress of a succeeding consignment until said member has been unlocked, said last mentioned means comprising rollers on said conveyer, a brake-shoe, and means for moving said brake-shoe into contact with said rollers.

17. In a conveyer system, a conveyer, branch conveyers leading therefrom, mechanisms for selectively deflecting commodities from said conveyer to said branch conveyers, photo-electric devices responsive to different colors positioned at various elevations with respect to said conveyer for actuating said mechanisms, and means of different colors positioned at various elevations with respect to said commodities for actuating a selected photo-electric device.

18. In a conveying system, a conveyer, a second conveyer associated therewith, means for transferring articles from one conveyer to the other, automatic means for operating the transferring means, said automatic means comprising a source of light, a photo-electric cell adapted to be activated by a beam of light from said source, and mechanism actuated by said cell for controlling the transferring means, said automatic means being set into operation upon the approach thereto of an article having a target thereon which affects the beam of light and causes the cell to actuate said mechanism.

19. In a conveying system, a conveyer, a branch conveyer leading laterally therefrom, transferring means for selectively changing the direction of travel of commodities laterally from said conveyer to said branch conveyer or permitting them to continue on said conveyer, a photo-electrically operated device controlling the operation of said transferring means, and means for selectively actuating said photo-electrically operated device consisting of a marker associated with said commodities and movable past said device.

20. In a conveying system, a conveyer, a branch conveyer leading therefrom, means for selectively diverting commodities from said conveyer to said branch conveyer, a photo-electrically operated device for controlling the operation of the diverting means to cause it to divert commodities to the branch conveyer, including mechanism for restoring said diverting means after it has caused a consignment of commodities to be diverted, and means for selectively actuating said device consisting of markers of selected type associated with said commodities and movable past said device.

MARTIN J. ANDERSON.